(12) United States Patent
Esschendal et al.

(10) Patent No.: US 10,079,483 B2
(45) Date of Patent: Sep. 18, 2018

(54) ASSEMBLY FOR ELECTRICALLY PROTECTING A POTENTIAL SHORT-CIRCUIT OR AN OVERLOAD IN A DIRECT CURRENT POWER NETWORK HAVING A SYSTEM-DETERMINED, VARIABLE SOURCE-INTERNAL RESISTANCE

(71) Applicant: Bayerische Motoren Werke Aktiengesellschaft, Munich (DE)

(72) Inventors: Horst Esschendal, Jesenwang (DE); Thomas Klawitter, Munich (DE); Paul Miederer, Woerth (DE); Hans Schwaiger, Munich (DE); Helmut Schmid, Attenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 14/945,489

(22) Filed: Nov. 19, 2015

(65) Prior Publication Data

US 2016/0072269 A1 Mar. 10, 2016

Related U.S. Application Data

(63) Continuation of application No. PCT/EP2014/064392, filed on Jul. 7, 2014.

(30) Foreign Application Priority Data

Jul. 29, 2013 (DE) .......................... 10 2013 214 726

(51) Int. Cl.
*H02H 1/00* (2006.01)
*H02H 3/087* (2006.01)
(Continued)

(52) U.S. Cl.
CPC ............ *H02H 1/0007* (2013.01); *H02H 3/08* (2013.01); *H02H 3/087* (2013.01); *H02H 3/24* (2013.01);
(Continued)

(58) Field of Classification Search
CPC ................................. H02H 9/04; H02H 9/041
(Continued)

(56) References Cited

U.S. PATENT DOCUMENTS 5,703,746 A 12/1997 Onizuka et al.
7,433,794 B1 10/2008 Berdichevsky et al.
(Continued)

FOREIGN PATENT DOCUMENTS

AT 511 820 A4 3/2013
CN 1135981 A 11/1996
(Continued)

OTHER PUBLICATIONS

International Search Report (PCT/ISA/210) issued in counterpart PCT Application No. PCT/EP2014/064392 dated Aug. 26, 2014 with English-language translation (four (4) pages).
(Continued)

*Primary Examiner* — Dharti Patel
(74) *Attorney, Agent, or Firm* — Crowell & Moring LLP

(57) ABSTRACT

An assembly for electrical protecting a potential short-circuit path in a power network having an energy store and having a system-determined, variable source internal resistance. The assembly includes a separating element, the triggering characteristic of which is insufficiently sized for protecting a first and second conductor section of the potential short-circuit path in a first operating state of the energy store, and a second protection device, which is configured to protect the first and second conductor section against a load
(Continued)

which occurs below the triggering limit of the separating element in the first operating state.

13 Claims, 2 Drawing Sheets

(51) Int. Cl.
    *H02H 3/24*     (2006.01)
    *H02H 7/26*     (2006.01)
    *H02H 3/08*     (2006.01)
    *B60R 16/033*     (2006.01)

(52) U.S. Cl.
    CPC ............ *H02H 3/243* (2013.01); *H02H 7/268* (2013.01); *B60R 16/033* (2013.01)

(58) Field of Classification Search
    USPC .................................................. 361/91.1, 93.1
    See application file for complete search history.

(56) References Cited

U.S. PATENT DOCUMENTS

| | | |
|---|---|---|
| 2002/0097543 A1 | 7/2002 | Pannwitz et al. |
| 2010/0127663 A1 | 5/2010 | Furukawa et al. |
| 2012/0242344 A1 | 9/2012 | Ishishita |
| 2013/0021702 A1 | 1/2013 | Waltman et al. |
| 2014/0308546 A1 | 10/2014 | Niederl |
| 2014/0376137 A1* | 12/2014 | Wang ................... G01R 31/025 361/86 |

FOREIGN PATENT DOCUMENTS

| | | |
|---|---|---|
| CN | 102656048 A | 9/2012 |
| DE | 101 03 336 C1 | 12/2002 |
| DE | 10 2009 053 712 A1 | 6/2010 |
| DE | 10 2011 121 604 A1 | 6/2013 |
| WO | WO 2010/003835 A2 | 1/2010 |

OTHER PUBLICATIONS

German Search Report issued in counterpart German Application No. DE 10 2013 214 726.0 dated Mar. 13, 2014 with partial English-language translation (ten (10) pages).

Chinese-language Office Action issued in counterpart Chinese Application No. 201480034760.2 dated May 4, 2017 with English translation (13 pages).

Chinese Office Action issued in Chinese counterpart application No. 201480034760.2 dated Oct. 27, 2017, with partial English translation (Five (5) pages).

* cited by examiner

ASSEMBLY FOR ELECTRICALLY PROTECTING A POTENTIAL SHORT-CIRCUIT OR AN OVERLOAD IN A DIRECT CURRENT POWER NETWORK HAVING A SYSTEM-DETERMINED, VARIABLE SOURCE-INTERNAL RESISTANCE

CROSS REFERENCE TO RELATED APPLICATIONS

This application is a continuation of PCT International Application No. PCT/EP2014/064392, filed Jul. 7, 2014, which claims priority under 35 U.S.C. § 119 from German Patent Application No. 10 2013 214 726.0, filed Jul. 29, 2013, the entire disclosures of which are herein expressly incorporated by reference.

BACKGROUND AND SUMMARY OF THE INVENTION

The present invention relates to an assembly for electrically protecting against a potential short-circuit or an overload in a power network having a system-determined, variable source-internal resistance. In particular, the present invention relates to an improvement in a short-circuit path, protected by way of an active or passive disconnecting element, in particular a fuse, in an on-board power network, which is supplied with energy by way of an electrochemical energy store. This disconnecting element is referred to below as a first protection device. It can be, for example, a fuse, pyro-fuse or the like.

On-board power networks of vehicles are frequently supplied with electrical energy by way of electrochemical energy stores or are buffered by means of the latter. In this context, the efficiency of the electrochemical energy stores fluctuates greatly with different operational variables and characteristic variables. For example, a state of aging of an electrochemical energy store is responsible for an increase in its internal resistance. In addition, the internal resistance is considerably dependant on temperature. The maximum power or voltage which can be output by the electrochemical energy store and the maximum current which can be output by the electrochemical energy store limit the output of energy here in the worse case so considerably that overcurrent or overvoltage protection measures sometimes respond too late or not at all. This is explained below with the example of a fuse. The electrical line cross sections through on-board power network sections which are protected by a fuse are usually dimensioned such that in the case of a predetermined current on the section the fuse responds before electric lines could be damaged. Owing to electrical insulation measures, the heating characteristics of the electric line sections and of the fuse differ greatly from one another. It is therefore possible that in the case of a first (relatively high) overcurrent, the fuse is supplied with electrical power sufficiently early, owing to which it responds and protects the electric line. However, if a current below the response current of the fuse is generated on a line section over a sufficiently long period of time, the electric line sections can be excessively loaded without the fuse being able to protect the electric line sections. As a result, the electric lines can be damaged and, in addition, give rise to consequential damage in the periphery. In the case of a short-circuit, the internal resistance of the electrochemical energy store which stores the electrical energy used for conducting the current can also limit the short-circuit current in such a way that the response current for the fuse is not reached. For example, an aged, heavily discharged and/or cold battery can limit the short-circuit current flowing in the case of a short circuit in such a way that over the long term a section of the electric line represents the weakest point in the on-board power network, instead of the fuse.

An object of the present invention is to eliminate the abovementioned disadvantages of the prior art.

According to the invention, an assembly for electrically protecting a first operating state against a predefined load, such as, for example, a short circuit in an on-board power network with an electrochemical energy store, is therefore proposed. The on-board power network is composed of line sections with different line cross sections and the supplied components.

The different line cross sections are referred to here as a first line section and a second line section, wherein the first line section has a relatively large cross section and the second line section has a smaller cross section in comparison therewith.

The abovementioned assembly also results in different operating states which are referred to here as first and second operating states. In the first operating state, the electrochemical energy store can have a higher internal resistance than in a second operating state. In other words, in the first operating state the electrochemical energy store can have a lower state of charge (SOC) and/or a higher rate of aging and/or a lower temperature than in the second operating state. In other words, in the first operating state a considerably reduced short-circuit current can be expected than in the second operating state, with the result that the line sections located in the circuit of the fuse are overloaded in the case of a short-circuit/overload, since the fuse does not trigger sufficiently quickly.

In this context, the triggering characteristic of a fuse whose strength limit is inadequately dimensioned for protecting a second line section of the potential short-circuit path for a first operating state of the energy store is, in other words, the case which is discussed above in conjunction with the prior art. It is provided that the fuse does not respond sufficiently quickly for all operating states of the energy store.

The "strength limit" of the fuse is to be understood within the scope of the present invention as meaning a maximum current or a maximum power at which the resistance of the fuse increases greatly or (virtually) infinitely. The second line section is a section within the potential short-circuit path which is not sufficiently protected by the fuse for all operating states of the energy store or of the on-board power network. Said line section can be, for example, a line section which has a smaller cross section than a first line section within the potential short-circuit path.

"Potential short-circuit path" is understood within the scope of the present invention to be that path via which the short-circuit current flows in the case of a short circuit. In other words, in the case of a short circuit, a portion of the on-board power network lines, together with the actual short circuit, are referred to together as a short-circuit path. According to the invention, a second protection device is therefore provided which is configured to protect the second line section against loading which occurs below the strength limit of the fuse in the first operating state. According to the invention, different measures are considered as the second protection device. In particular, control of contactors within the on-board power network can be provided to interrupt the short-circuit current. For this purpose, measurement of the current or power can be carried out for the short-circuit path, in particular for the second line section, by which measurement such an operating state is detected, which puts the second line section at risk but which cannot be averted by the fuse alone. In particular, the load can be detected as such which, on the one hand, actually places the second line section at risk and, on the other hand, is actually below the strength limit of the fuse. In other words, that operating state which indicates that the second line section is put at risk owing to a non-response of the fuse can be protected by the second protection device. For this purpose, the second protection device can include, for example, current sensors in the form of Hall sensors, inductive sensors or shunts. If a current which is in a predefined range is measured, the second protection device can open contactors and the short-circuit path can disconnect from the electrical energy store in this way.

In a further development, for example, the second protection device can include a cell undervoltage shutdown system for the electrochemical energy store. Cell undervoltage shutdown systems are known in the prior art for monitoring the electrical voltage of individual cells of an electrochemical energy store which is composed of a plurality of cells, and for averting the case of an undervoltage by shutting down the electrochemical energy store. An inventive use of a cell undervoltage shutdown system for protecting against a potential short-circuit path outside the electrical energy store is, however, not yet known. Of course, the cell undervoltage shutdown system can be modified according to the invention. For example, the variation of a cell voltage over time can be taken into account, with the result that an undervoltage case can be attributed to an undesired short-circuit with a high level of probability, and there is therefore a high level of probability that it is responsible for the cell undervoltage. The cell undervoltage shutdown system can detect here the short-circuit case insofar as the heavily overloaded short-circuit current gives rise to an increased voltage drop at the internal resistance of the electrochemical energy store or the respective cell. Alternatively or additionally, an overcurrent shutdown system, comprising a current measuring device, can be provided in the second protection device. The overcurrent shutdown system can (as stated above) determine a measured value for the short-circuit current, and open the contactors of the electrochemical energy store in response to detection of the first operating state. Since the mechanisms of the above-mentioned second protection devices are present in contemporary topologies for storage protection, the invention can be implemented by way of simple, inventive adaptation of their actuation (for example, in the form of software code).

An overcurrent shutdown system is usually expected in the form of a cell undervoltage shutdown system in relatively high power ranges of the electrochemical energy store. In particular in the event of both an undervoltage shutdown system and an overcurrent shutdown system being provided according to the invention as the second protection device, it may also advantageously be provided that a lower current threshold value for the overcurrent shutdown system, and an upper voltage threshold value for the cell undervoltage shutdown system, are defined such that the response ranges of the overcurrent shutdown system and the cell undervoltage shutdown system at least adjoin one another. The triggering characteristic, chronological limiting values, current thresholds and voltage thresholds of the shutdown system owing to overcurrent shutdown system and undervoltage shutdown system are to be matched here to the triggering characteristic of the fuse and to the switching behavior of the disconnecting elements of the second protection device. Shutting down of the second protection device must therefore not take place too early in order to avoid overloading the contactors, and to permit triggering of the fuse. At the same time, the thermal overloading of the line in the case of a short circuit is to be avoided. In this way, reliable protection of the potential short-circuit path can be ensured over a wide working range of the electrochemical energy store. In order to improve the protection, in real application cases an overlap should be ensured between the operating states protected by the cell undervoltage shutdown system and those protected by the overcurrent shutdown system.

A possible and preferred dimensioning of the assembly mentioned above obeys the condition that the total number of cells of the energy store which are connected in series, when multiplied with a minimum cell individual voltage in the case of response of the cell undervoltage shutdown system divided by a lower current limiting value in the case of response of the overcurrent detection system, is higher than a maximum short-circuit resistance which can be assumed for the potential short-circuit path. In this context, the minimum cell individual voltage is understood to be such a voltage which, given an identical cell voltage of all the cells of the energy store, just brings about a response of the cell undervoltage shutdown system. This voltage represents the worst case which can occur in terms of the cell voltage during a short-circuit. Here, the maximum short-circuit resistance to be assumed is that resistance which occurs for the entire path conducting the short-circuit current, and is defined at the same time as a short-circuit case. In this way, particularly safe dimensioning is obtained by means of an overlap between the response ranges of the cell undervoltage shutdown system and those of the overcurrent shutdown system.

The second protection device is also preferably configured to have an inertia in the case of response such that, on the one hand, the potential short-circuit path is reliably protected even without response of the fuse and, on the other hand, outside the first operating state the fuse responds before the second protection device. Since, in fact, a response of the second protection device in the case of high current can lead to destruction or abnormal loading of the contactors, the high currents protection by response of the fuse is preferred. In order to provide inventive protection of a wide operating range, it is, however, necessary to make reliable use of the second protection device in conjunction with the contactors below a strength limit of the fuse.

It is also preferred here that the inertia of the second protection device is suitable for suppressing a response process in the case of brief current peaks, in particular even corresponding brief regulating interventions. In other words, in the response range of the second protection device, brief excessive increases of respectively defined threshold values are tolerated without the second protection device responding. Therefore, the second protection device can be dimensioned here as a function of electrical characteristic variables of the respective on-board power network which are to be evaluated as "normal".

It is also preferred here that the inertia of the second protection device is suitable for differentiating an overload situation or short-circuit situation of the first and second line sections from a maximum operating situation of the first line section, and therefore for actually triggering only in the case of an overload and/or short circuit.

The second line section preferably has a smaller line cross section than a first line section of the same short-circuit path. The second line section is, as a result, given smaller electrical dimensions and forms, compared with the first line section, a section which is at a high probability of being put at greater risk in the case of a short-circuit current.

According to a further aspect of the present invention, a vehicle, comprising an electrochemical energy store and an assembly as discussed above, is proposed. The locomotion means can be, for example, an electric drive vehicle (PHEV, HEV, EV etc.). In this context, the electrochemical energy store can be configured as a traction battery and at least part of the potential short-circuit path can be configured as part of an on-board power network section which is configured to distribute the traction energy.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
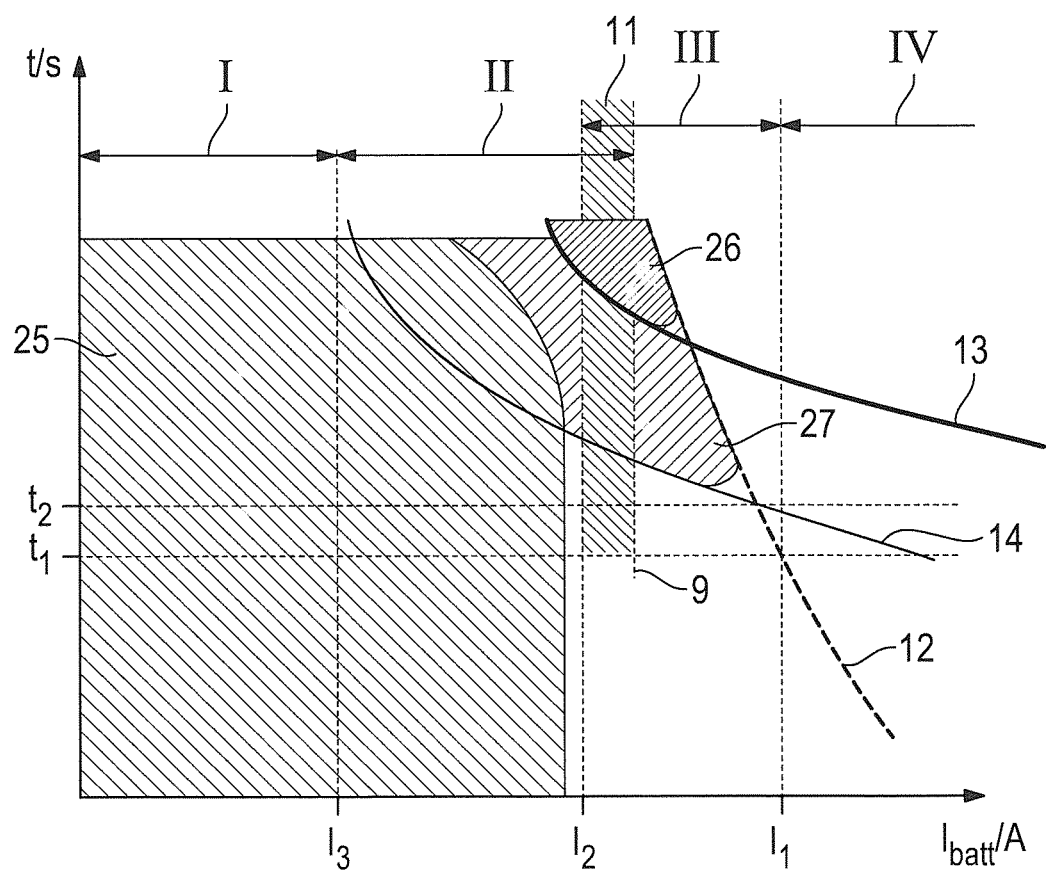
FIG. 1 is a diagram of current-monitoring mechanisms used according to the invention, in the form of a shutdown time of the respective safety mechanism plotted against a current through the high-voltage store.

FIG. 1 shows the shutdown time t plotted against a current $I_{bat}$ of the high-voltage store (electrochemical energy store). In a first range I of the electrochemical energy store, a short-circuit current $I_{bat}$ below a limit I3 is so low that all the line sections of the potential short-circuit path remain undamaged. In other words, none of the protection devices to be provided according to the invention are configured to protect this operating range. This does not, of course, mean that a short-circuit current in this range should reasonably be accepted. It merely means that protection against overheating and any consequential damage is not necessary. An operating range IV is protected in a conventional way by a fuse. The corresponding characteristic curve 12 relating to the strength of the fuse describes the shutdown time t plotted against the current $I_{bat}$. The characteristic curve 13 describes the overload limit of the first line section, in other words, for example, a line with a cross section of 35 mm². Above the intersection point of the protection characteristic curve 12 and of the line characteristic curve 13, this line is thermally overloaded in the case of overloading or short-circuit, since the fuse does not reliably trigger in this range 26. The characteristic curve 14 describes the overload limit of the second line section, in other words, for example, a line with a cross section of 16 mm². Above the intersection point of the protection characteristic curve 12 and the line characteristic curve 14, this line is thermally overloaded in the case of overload or a short circuit, since the fuse does not reliably trigger in this range 27. Taking into account a certain response time, which is between $t_1$ and $t_2$, a range below these critical characteristic field points (high-voltage storage currents $I_{bat}$) is therefore to be protected as range III by means of the overcurrent detection system as a component of the second protection device. This range extends between the currents I2 and I1. For even lower currents, in other words currents between I3 and I2, it is possible according to the invention to use the cell undervoltage shutdown system as a component of the second protection device. The shutdown time of the second protection device is dimensioned in such a way that the maximum permissible shutdown time $t_2$ for protecting the weakest line section is not exceeded and at the same time a minimum time $t_1$ is exceeded, in order to avoid an overload of the contactors and to permit triggering of the fuse. This chronological characteristic of the second protection device arises from the fact that the overload current or short-circuit current which occurs is initially unknown in terms of the level which it will ultimately assume. The lower limiting value of the overcurrent detection system I2 must be defined as being higher than the operating range of the first line section 25. The upper limit 9 of the undervoltage shutdown system is above the minimum limit I2 of the overcurrent shutdown system, with the result that an overlapping range 11 is produced.

Figure 2:
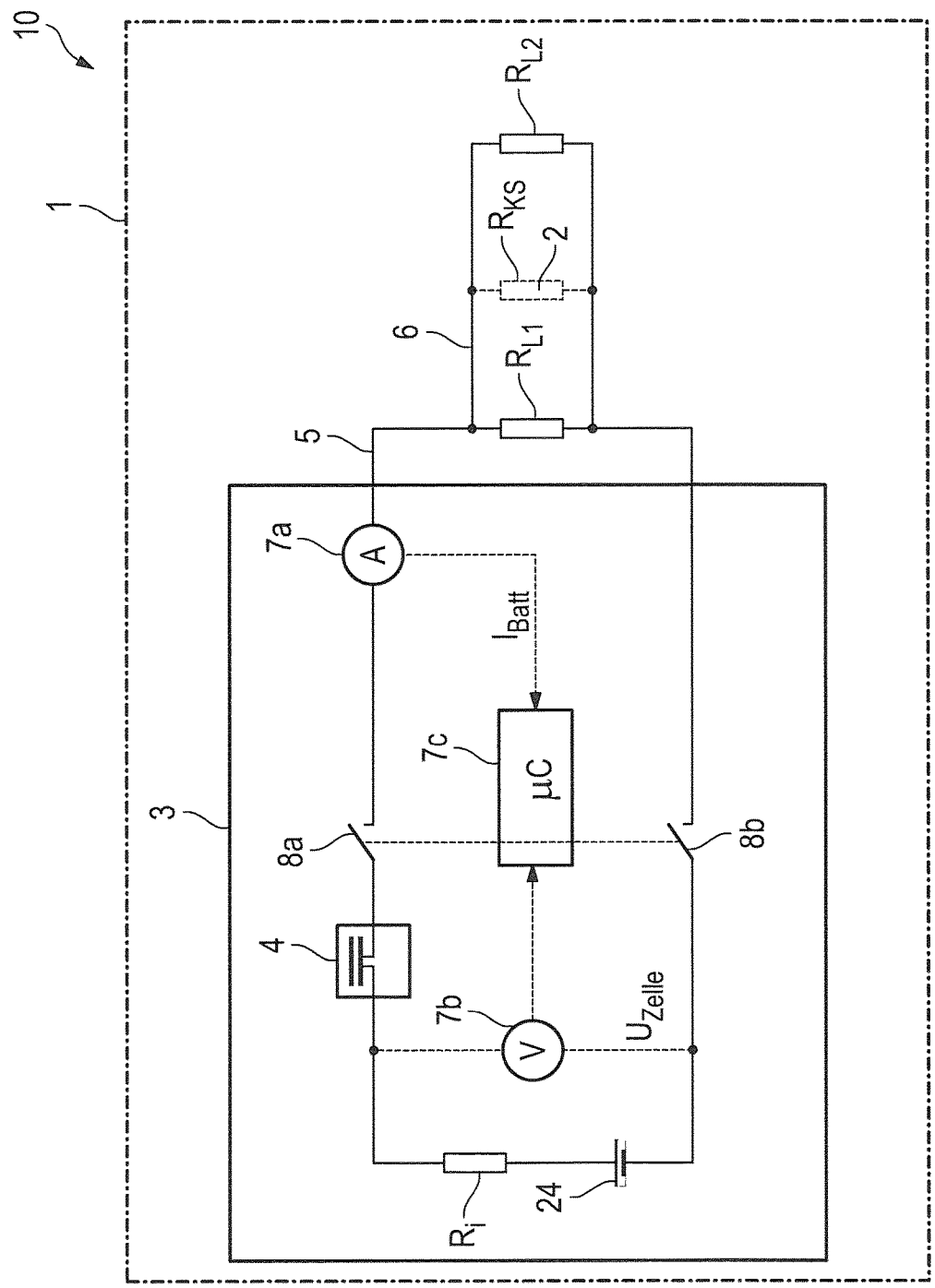
FIG. 2 is a schematic circuit diagram of a possible topology of an on-board power network, comprising an exemplary embodiment of an assembly according to the invention.

FIG. 2 shows an on-board power network 10 as a power network. The power network includes a high-voltage battery 3 as an electrochemical energy store. Within the high-voltage battery 3, a disconnecting element (e.g. a fuse) 4 is illustrated in series with an electrochemical cell 24, wherein the electrochemical cell 24 is merely symbolically representative of a large number of electrochemical cells. One or more disconnecting elements (e.g. contactors) 8a, 8b are configured to connect electric lines starting from the electrochemical cell 24 to the periphery, or to disconnect them therefrom. Furthermore, the high-voltage battery includes a current sensor 7a and a voltage sensor 7b, wherein the voltage sensor 7b is to be understood as merely symbolic. It can stand for a multiplicity of cell individual voltage measurements or else also as a total voltage measurement or a partial voltage measurement. Current and voltage values of the sensors 7a and 7b are evaluated by a microcontroller 7c which is integrated in the high-voltage battery 3. The microcontroller 7c controls the contactors 8a, 8b to disconnect or connect the electric lines 5, 6 from or to the electrochemical cell 24. Electrical consumers $R_{L1}$ and $R_{L2}$ are connected to the high-voltage battery 3 via electric lines. A second line section 6, which should conduct electrical energy originating from the high-voltage battery 3 to the first consumer $R_{L2}$ via a first line section 5 is illustrated by way of example. Owing to the short-circuit $R_{KS}$, a short-circuit path is produced via the line sections 5 and 6, via which a short-circuit current flows. Insofar as the electrical cells 24 of the high-voltage battery 3 are in an operating state in which, even in the case of a short circuit within the second line section 6, the short-circuit current which occurs is not sufficient to allow the fuse 4 to respond in sufficient time, the short-circuit current can be interrupted by opening the contactors 8a, 8b by way of the current sensor 7a or a cell voltage measurement 7b of the microcontrollers 7c in conjunction with the contactors 8a, 8b as a second protection device.

LIST OF REFERENCE SYMBOLS

1 Assembly
2 Short-circuit path
3 High-voltage battery
4 Fuse
5 First line section
6 Second line section
7a Current sensor
7b Voltage sensor
7c Microcontroller
$R_{L1}$ Electrical consumer in the first line section
$R_{L2}$ Electrical consumer in the second line section $R_{KS}$ Short-circuit resistance
Ri Variable internal resistance of the electrochemical store/high-voltage battery
8a, b Contactor
9 Upper limit of the undervoltage detection system for a maximum resistance in the overload path
10 On-board power network
11 Overlapping range between the undervoltage detection system and overcurrent detection system
12 Triggering characteristic curve of the fuse
13 Limiting curve of the first line section
14 Limiting curve of the second line section
24 Electrochemical cell
25 Maximum operating range of the electrical consumer connected in the first line section
26 Region of the first line section not protected by fuse
27 Region of the second line section not protected by fuse
I1 Maximum switchable current of the line switch/contactor
I2 Lower limiting value of the overcurrent detection system
I3 Maximum steady-state operating current of the second line section
t1 Minimum duration until triggering of shutdown mechanisms
t2 Maximum permissible shutdown time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly for an electrically protecting a first operating state of a power network having a system-determined, variable source-internal resistance of an energy source, the assembly comprising:
    a first protection device configured to have a response behavior that is insufficient to protect the power network against a predefined load in the first operating state of the power network; and
    a second protection device configured to protect the power network against a load occurring below the response behavior of the first protection device in the first operating state,
    wherein outside of the first operating state the first protection device is triggered before triggering a protective function of the second protection device.

2. The assembly according to claim 1, wherein the second protection device comprises:
    an undervoltage shutdown system having a voltage measuring device for the energy source, which energy source is an electrochemical energy store; and/or
    an overcurrent shutdown system having a current measuring device for the electrochemical energy store.

3. The assembly according to claim 2, wherein
    a lower current threshold value for the overcurrent shutdown system and an upper voltage threshold value for the undervoltage shutdown system are defined such that response ranges of the overcurrent shutdown system and the undervoltage shutdown system at least adjoin one another.

4. The assembly according to claim 3, wherein the response ranges overlap with one another.

5. The assembly according to claim 3, wherein
    a total number of cells of the electrochemical energy store connected in series, when multiplied with a minimum cell individual voltage in a case of a response of the undervoltage shutdown system divided by a lower current limiting value in a case of a response of the overcurrent detection system, is higher than a maximum short-circuit resistance assumable for a potential short-circuit path.

6. The assembly according to claim 1, wherein
    the second protection device is configured to have an inertia in the case of a response such that, on one hand, a potential short-circuit path is protected even without a triggering of the first protection device in the form of a fuse and, on the other hand, the fuse triggers before triggering the protective function of the second protection device outside the first operating state.

7. The assembly according to claim 6, wherein the inertia of the second protection device suppresses a response process in an event of brief current peaks.

8. The assembly according to claim 1, wherein
    a short-circuit path has a second line section having a smaller line cross section than a first line section, and
    a strength limit of the first protection device in the form of a fuse is dimensioned inadequately to protect the second line section in the first operating state of the energy source.

9. The assembly according to claim 1, wherein the second protection device is configured to open a disconnecting element in the case of a response.

10. The assembly according to claim 1, wherein the energy source has a higher internal resistance in the first operating state than in a second operating state.

11. A vehicle, comprising:
    an energy store; and
    an assembly for electrically protecting a first operating state of a vehicle power network having a system-determined, variable source-internal resistance of the energy store, the assembly comprising:
    a first protection device configured to have a response behavior that is insufficient to protect the power network against a predefined load in the first operating state of the power network; and
    a second protection device configured to protect the power network against a load occurring below the response behavior of the first protection device in the first operating state,
    wherein outside of the first operating state the first protection device is triggered before triggering a protective function of the second protection device.

12. The vehicle according to claim 11, wherein the vehicle is an electric vehicle.

13. The vehicle according to claim 12, wherein the energy store is an electrochemical energy store.

* * * * *